Figures 1, 2:
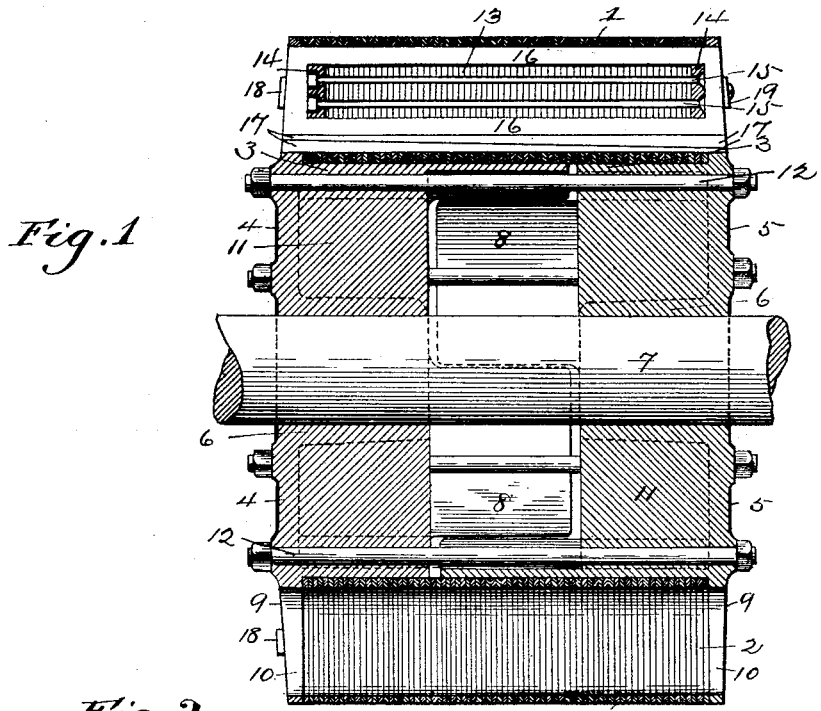

(No Model.) 2 Sheets—Sheet 1.

J. F. McLAUGHLIN.
ELECTRIC MOTOR OR GENERATOR.

No. 497,888. Patented May 23, 1893.

Witnesses:
J. B. McGirr.
H. T. Chapman.

Inventor:
James F. McLaughlin
By Joseph Lyons
Attorney.

(No Model.) 2 Sheets—Sheet 2.

J. F. McLAUGHLIN.
ELECTRIC MOTOR OR GENERATOR.

No. 497,888. Patented May 23, 1893.

Witnesses:
J. B. McGirr.
H. T. Chapman

Inventor,
James F. McLaughlin,
By Joseph Lyons.
Attorney

UNITED STATES PATENT OFFICE.

JAMES F. McLAUGHLIN, OF PHILADELPHIA, PENNSYLVANIA.

ELECTRIC MOTOR OR GENERATOR.

SPECIFICATION forming part of Letters Patent No. 497,888, dated May 23, 1893.

Application filed July 27, 1892. Serial No. 441,401. (No model.)

*To all whom it may concern:*

Be it known that I, JAMES F. McLAUGHLIN, a citizen of the United States, and a resident of Philadelphia, in the county of Philadelphia and State of Pennsylvania, have invented certain new and useful Improvements in Electric Motors or Generators, of which the following is a specification.

This invention has reference to improvements in electric motors or generators and its principal object is to improve the construction of the armature.

In Letters Patent No. 458,856, granted to me on September 1, 1891, there is shown an armature, the body of which is composed of laminæ strung upon a shaft and clamped between two heads. Near its periphery the armature is provided with a circular series of square or segmental channels for the reception of armature coils, which latter are wound upon suitable bobbins and are then inserted in the channels. These armature coils are of such size as to completely fill the channels with their bobbins in contact with the walls of the said channels. Consequently considerable force has to be used in order to insert the armature coils in the channels or to withdraw them therefrom in case they are injured when it is necessary to replace them by new coils for the coils have to fit the channels tightly in order to insure good magnetic contact between their cores and the body of the armature.

In constructing an armature in accordance with the present invention, the armature body is lightened and material is saved by making the laminæ ring-shaped and supporting and clamping them together by means of a two-part spider of peculiar construction.

In accordance with my present invention the channels for the reception of the armature coils extend, as in my aforesaid patent, radially with reference to the armature body, but they are wider on the inner end than on the outer end, with the two ends parallel, and the two sides outwardly converging to each other. These channels are, therefore, trapezoidal, and the bobbins or cores upon which the armature coils are wound, are similarly shaped, but are slightly smaller on all sides in order that they may be easily slipped into or out of the wider portions of the channels. When in the channels, the armature coils are forced outward to the narrower portions of the channel where their cores are brought into firm contact with the walls of the channel. This is effected by means of wedges driven into the wider portions of the channels and which may be readily removed when it is desired to withdraw any of the the armature coils from the armature body.

The improved armature as well as certain improvements in the construction of the motor frame are shown in the accompanying drawings forming part of this specification, and in which—

Figure 3:
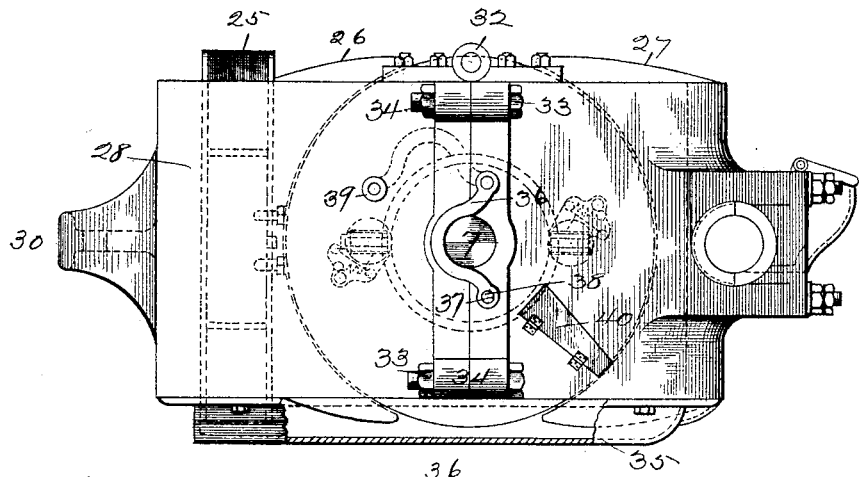
Figure 4:
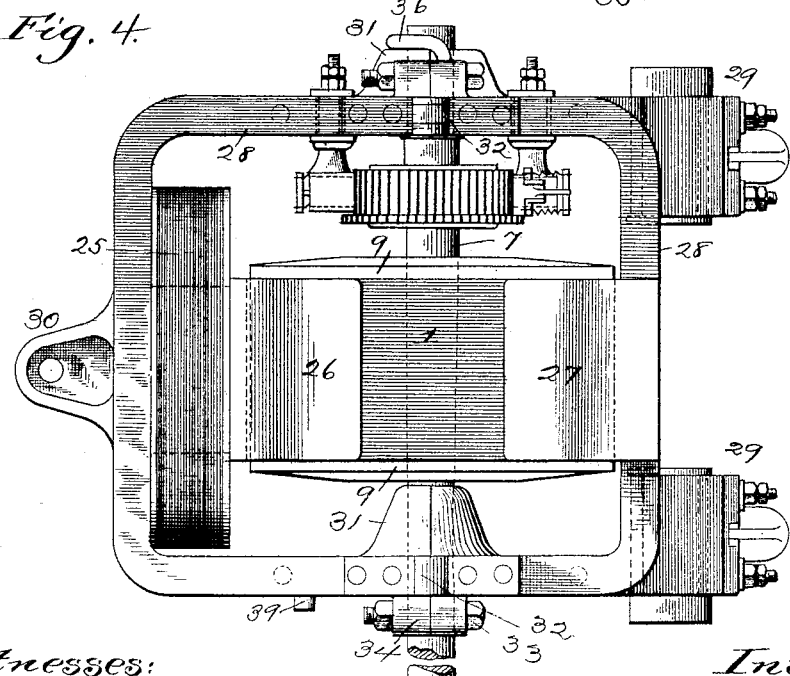

Figure 1, is a central section of an armature constructed in accordance with my present invention. Fig. 2, is an end view, partly in section, of a portion of the improved armature. Figs. 3 and 4, are an end elevation and a plan view, respectively, of an electric motor embodying the present invention.

Referring more particularly to Figs. 1 and 2, there is shown an armature body composed of annular or ring-shaped laminæ 1, each of which has a circular series of perforations 2, extending from near the inner edge to near the outer edge thereof and having their sides tapered so that the inner end of each perforation is wider than the outer end. When the armature is built up these perforations are arranged so as to match and thereby form channels through the armature close to the periphery, for the reception of the armature coils, the construction of which latter will be hereinafter described. The laminæ 1, are supported upon cylindrical flanges 3, projecting laterally from spiders 4, 5, the hubs 6, of which are upon an armature shaft 7. The free end of each flange 3, is provided with tooth like projections 8, forming extensions of the said flanges, and separated by spaces slightly wider than the said projections, so that when the spiders are brought one toward the other, the projections 8, on one spider will enter between the projections 8, on the other spider, thereby interlocking. Each spider has formed on it an annular flange 9, projecting radially outward from the base of the flange 3, and provided with a series of slots 10, corresponding in size and shape to the perforations 2, in the laminæ. The flanges 9, are of the same diameter as the laminæ 1, and when the two spiders are forced one toward the other, the laminæ will be firmly clamped between them and the slots 10 in these flanges will be arranged in line with or match the perforations 2, so that the channels pass clear through the armature body. Strengthening webs 11, extend from the hubs 6 to the flanges 3. The spiders are forced one toward the other by means of bolts 12, and when so secured together the entire armature body is held against any tendency to twist and the bolts are relieved from lateral strain by the interlocking projections or teeth 8.

Referring now to the armature coils, they are wound upon bobbins each of which is composed of a core 13, of laminated iron terminating in heads 14 and secured together by rivets or bolts 15, while the sides 16, of the bobbin are made of vulcanized fiber or other suitable material. These sides 16, are merely frames through which the core extends and between which the wire of the coil is wound and retained. The outer surfaces of the sides 16, are tapered to conform to the shape of the channels in the armature body. The core of the armature coil may be made from the pieces of the laminæ 1, which are punched out to form the perforations 2, and a portion of the ends of each of these pieces is cut off so that when the side pieces 16 are fitted to the armature coil-core, and the wire has been wound in place, the breadth of the coil, that is, the distance from the widest portions of the bobbins to the narrowest portions of the same will be less than the length of the perforations 2.

The armature coils shaped as described, may be inserted longitudinally into the wider portions of the channels in the armature body and then forced radially outward into the narrower portions of these channels until their cores are in firm magnetic contact with the walls thereof. A simple and very efficient means for forcing the armature coils into the narrowest portions of the channels are the wedges 17, driven into the channels at their widest portions. I prefer to use two wedges of wood, or other suitable material, driven into the channels from the opposite ends thereof.

I do not depend upon the frictional contact of the bobbins with the sides of the channel to maintain the armature coils in place, but provide other means for this purpose. On the flange 9 of the spider 4, on each side of each slot 10, there are formed lugs 18, so as to project slightly into the path of the coil bobbins when inserted in the channels and act as stops for the said bobbins, and the outer face of the flange 9, of the spider 5, is provided with latch bars 19, each projecting over one, two, or more of the openings 10. These bars may be secured in place in a variety of ways, and one means I have shown consists of a screw 20, passing through the middle of the bar and into the flange 9. Another means of securing the bar 19, consists in lugs or sockets 21, cast on the flange 9, and shaped to receive the ends of the bars, and through these lugs or sockets extend cotters 22, in front of the bar, thus holding it against accidental displacement.

It will be understood that the laminæ of both the armature body and the cores of the armature coils are suitably separated from each other by insulating material, and the bolts or rivets 15 are covered with insulation. The spiders 4, 5, are made of any suitable non-magnetic metal.

In an armature constructed as described there is scarcely any waste of material, since nearly all of the portions of the laminæ that are punched out to form the perforations 2, are utilized for the cores of the armature coil bobbin. The armature coils may be inserted in the channels or withdrawn therefrom with the greatest ease since they are smaller than the said channels, while at the same time they may be forced with their cores into the most intimate contact with the armature body without in any manner interfering with their subsequent removal, should such be desirable or necessary.

In an armature constructed in accordance with my invention each bobbin may contain a number of layers of wire forming either a single continuous armature coil, as shown at 23, on the right hand side of Fig. 2, or these layers of wire may constitute two independent coils, one wound on top the other, as shown at 24, Fig. 2.

Referring now more particularly to Figs. 3 and 4, there is shown a motor embracing certain features of the invention. The motor is provided with a single flat field coil 25, to the core of which is secured one pole piece 26, the other pole piece 27, being connected thereto by a yoke composed of a rectangular frame 28, comprising the frame of the motor. One end of this frame is provided with bearings 29, for the axle of the vehicle to be driven; the other end of the frame is provided with an ear 30, by means of which the motor is supported by the truck-frame of the vehicle. The armature shaft 7, has bearings in the sides of the motor frame midway between the two pole pieces 26 27, there being bosses 31 formed on the side pieces to provide extended bearings for the shaft. The frame 28, is divided vertically into two parts in a plane passing through the axis of the armature shaft, and at the top these two parts are connected together by hinges 32 so that the section of the motor frame carrying the field magnet coil may be swung upward and away from the armature, thus exposing the latter to view, for inspection or repair. The two parts of the field magnet frame are held together by bolts 33 passing through ears 34, cast on the frame as shown. Secured to the lower edge of the frame, by bolts or screws, is a pan 35, protecting the working parts of the motor from dust or dirt, which is liable to rise when a traveling vehicle passes over a road bed.

When it is desired to inspect the interior of the motor, the pan 35 is removed and the bolts 33 are withdrawn, after which the movable section of the motor is swung up out of the way. In order to prevent the armature from dropping out of its bearing when the motor frame is opened, the stationary section of the motor frame has pivoted to it, on each side, a bent strap 36, which embraces the armature shaft on the side normally supported by the hinged section of the motor frame, and this strap has its free end provided with an eye 37, through which is passed a pin 38, entering the fixed section of the motor frame when the strap has been so placed as to embrace the armature shaft and prevent it from falling away from its bearings. When the motor frame is closed, this pivoted strap 36, is swung out of the way, as shown in dotted lines, Fig. 3, and is held in such position by the pin 38, which enters a perforation or perforated stud 39 on the motor frame.

As it is desirable to remove and replace armature coils without dismantling the motor, the sides of the motor frame are each provided with a perforation, closed by a door 40, and so located and of such size that an armature coil may be inserted in the armature body, or withdrawn therefrom, through these perforations.

Having now fully described my invention, I claim and desire to secure by Letters Patent—

1. In an electric motor or generator, an armature comprising an iron body with a circular series of channels near its outer edge, armature coils having iron cores and removably housed in said channels, and wedges in the channels for forcing the armature-coil cores into intimate contact with the channel-walls, substantially as described.

2. In an electric motor or generator, an armature comprising an iron body with a circular series of channels near its outer edge, said channels having their side walls converging toward the periphery of the armature body; similarly shaped iron armature coil bobbins of smaller cross-section than the channels, and wedges in the channels, for forcing the armature-coil cores into intimate contact with the channel walls, substantially as described.

3. In an electric motor or generator, an armature comprising a laminated iron body with a circular series of channels near its periphery, armature coils with iron cores and housed in the said channels, and wedges in the channels for forcing the armature-coil cores into intimate contact with the channel walls, substantially as described.

4. In an electric motor or generator, an armature comprising an iron body with a circular series of channels near its periphery, armature coils with laminated iron cores and housed in said channels, and wedges in the channels for forcing the armature coil cores into intimate contact with the channel walls, substantially as described.

5. In an electric motor or generator, an armature comprising a laminated iron body with a circular series of channels near its periphery, armature coils with laminated iron cores and housed in the said channels, and wedges in the channels for forcing the armature-coil cores into intimate contact with the channel walls, substantially as described.

6. In an electric motor or generator, an armature body composed of ring-shaped laminæ and having a circular series of channels near its periphery, and supporting spiders provided with cylindrical interlocking flanges supporting the laminæ and annular flanges between which the laminæ are clamped, substantially as described.

7. In an electric motor or generator, an armature having a core composed of ring-shaped laminæ, in combination with interlocking supporting spiders, substantially as described.

8. In an electric motor an armature comprising an iron body with a circular series of channels near its periphery, each channel being provided with a stop at one end, armature-coils housed in said channels, and latch bars applied to the other ends of the channels, substantially as described.

9. In an electric motor, a frame therefor, divided vertically into two parts, in a plane passing through the axis of the armature shaft, and hinged together at the top, and straps on the frame for retaining the armature shaft in its bearings when the motor frame is opened, substantially as described.

10. In an electric motor, the combination with an armature composed of a body having channels near its outer edge, and armature coils housed in said channels, of a motor frame inclosing the armature and provided with openings in line with the channels in the armature body, whereby armature coils may be introduced into or removed from the armature without dismantling the motor, substantially as described.

In testimony whereof I have signed my name to this specification in the presence of two subscribing witnesses.

JAMES F. McLAUGHLIN.

Witnesses:
MICHAEL G. PLUNKETT,
C. L. BROWN.